US012586944B2

(12) United States Patent
Gingrich, III et al.

(10) Patent No.: US 12,586,944 B2
(45) Date of Patent: Mar. 24, 2026

(54) ELECTRICAL CONNECTOR WITH ANGLED CONTACTS WITH ARRANGEMENT FOR CONTROLLING CROSSTALK

(71) Applicant: TE Connectivity Solutions GmbH, Schaffhausen (CH)

(72) Inventors: Charles Raymond Gingrich, III, Mechanicsburg, PA (US); Keith Edwin Miller, Manheim, PA (US); Scott Eric Walton, Mount Joy, PA (US)

(73) Assignee: TE Connectivity Solutions GmbH (CH)

( * ) Notice: Subject to any disclaimer, the term of this patent is extended or adjusted under 35 U.S.C. 154(b) by 571 days.

(21) Appl. No.: 18/050,559

(22) Filed: Oct. 28, 2022

(65) Prior Publication Data

US 2024/0145968 A1 May 2, 2024

(51) Int. Cl.
*H01R 13/04* (2006.01)
*H01R 12/58* (2011.01)
(Continued)

(52) U.S. Cl.
CPC ........... *H01R 13/04* (2013.01); *H01R 12/585* (2013.01); *H01R 12/7005* (2013.01); *H01R 13/42* (2013.01); *H01R 13/62* (2013.01); *H01R 13/6471* (2013.01); *H01R 13/658* (2013.01); *H01R 13/6587* (2013.01);
(Continued)

(58) Field of Classification Search
CPC .. H01R 13/04; H01R 12/585; H01R 12/7005; H01R 13/42; H01R 13/62; H01R 13/6471; H01R 13/658; H01R 13/6587; H01R 12/55; H01R 12/58; H01R 12/7011; H01R 12/7017; H01R 12/7064; H01R 12/71; H01R 12/712; H01R 12/716; H01R 13/05; H01R 13/627; H01R 13/646; H01R 13/6461; H01R 13/648; H01R 13/6581; H01R 13/6591; H01R 13/6594; H01R 13/6595
See application file for complete search history.

(56) References Cited

U.S. PATENT DOCUMENTS

| | | | | |
|---|---|---|---|---|
| 5,664,968 A * | 9/1997 | Mickievicz | H01R 13/6582 439/607.1 |
| 6,672,886 B2 * | 1/2004 | Billman | H01R 12/737 439/82 |

(Continued)

*Primary Examiner* — Justin M Kratt

(57) ABSTRACT

An electrical connector for use in an electrical connector system which controls cross talk and signal radiation. The electrical connector having a plurality of modules with mating ends and mounting ends. Signal contacts have signal mating contact receiving sections proximate the mating ends and signal circuit board mounting sections proximate the mounting ends. The signal contacts are angled relative to a plane of the mounting ends of the modules, wherein the signal mating contact receiving sections are offset from the signal circuit board mounting section. Ground contacts have ground mating contact receiving sections proximate the mating ends and ground circuit board mounting sections proximate the mounting ends. The ground contacts are angled relative to the plane of the mounting ends of the modules, wherein the ground mating contact receiving sections are offset from the ground circuit board mounting sections.

16 Claims, 6 Drawing Sheets

(51) Int. Cl.

| | |
|---|---|
| ***H01R 12/70*** | (2011.01) |
| ***H01R 13/42*** | (2006.01) |
| ***H01R 13/62*** | (2006.01) |
| ***H01R 13/6471*** | (2011.01) |
| ***H01R 13/658*** | (2011.01) |
| ***H01R 13/6587*** | (2011.01) |
| *H01R 12/55* | (2011.01) |
| *H01R 12/71* | (2011.01) |
| *H01R 13/05* | (2006.01) |
| *H01R 13/627* | (2006.01) |
| *H01R 13/646* | (2011.01) |
| *H01R 13/6461* | (2011.01) |
| *H01R 13/648* | (2006.01) |
| *H01R 13/6581* | (2011.01) |
| *H01R 13/6591* | (2011.01) |
| *H01R 13/6594* | (2011.01) |
| *H01R 13/6595* | (2011.01) |

(52) U.S. Cl.

CPC .............. *H01R 12/55* (2013.01); *H01R 12/58* (2013.01); *H01R 12/7011* (2013.01); *H01R 12/7017* (2013.01); *H01R 12/7064* (2013.01); *H01R 12/71* (2013.01); *H01R 12/712* (2013.01); *H01R 12/716* (2013.01); *H01R 13/05* (2013.01); *H01R 13/627* (2013.01); *H01R 13/646* (2013.01); *H01R 13/6461* (2013.01); *H01R 13/648* (2013.01); *H01R 13/6581* (2013.01); *H01R 13/6591* (2013.01); *H01R 13/6594* (2013.01); *H01R 13/6595* (2013.01)

(56) References Cited

U.S. PATENT DOCUMENTS

| | | | | |
|---|---|---|---|---|
| 10,003,144 | B1 | 6/2018 | Sharf | |
| 10,993,314 | B2 | 4/2021 | Charbonneau et al. | |
| 10,998,678 | B1 | 5/2021 | Miller et al. | |
| 11,025,014 | B1 | 6/2021 | Miller et al. | |
| 11,031,734 | B1 * | 6/2021 | Miller ................ | H01R 13/6587 |
| 2003/0220021 | A1 * | 11/2003 | Whiteman, Jr. ... | H01R 13/6587 439/607.08 |
| 2007/0099455 | A1 * | 5/2007 | Rothermel ........... | H01R 12/585 439/108 |

* cited by examiner

ELECTRICAL CONNECTOR WITH ANGLED CONTACTS WITH ARRANGEMENT FOR CONTROLLING CROSSTALK

FIELD OF THE INVENTION

The present invention relates to a connector that has angled contacts. In particular, the invention relates to a connector that has angled contacts to create a staggered footprint to improve signal integrity while maintaining a mating interface which is backward compatible with previous connectors.

BACKGROUND OF THE INVENTION

Due to the increasing complexity of electronic components, it is desirable to fit more components in less space on a circuit board or other substrate. Consequently, the spacing between electrical contacts within connectors has been reduced, while the number of electrical contacts housed in the connectors has increased, thereby increasing the need in the electrical arts for electrical connectors that are capable of handling higher and higher speeds and to do so with greater and greater pin densities. It is desirable for such connectors to have acceptable levels of impedance and crosstalk, as well as other acceptable electrical and mechanical characteristics.

With the increasing complexity of the components, the pattern or spacing of the contacts at the mating end of the connector may be different that the pattern or spacing at the mounting end of the connector. This is particularly true when the crosstalk between the contacts must be controlled. In order to provide for different configuration between the mating end and the mounting end, the mounting ends of the contacts may be offset from the longitudinal axes of the mating ends of the contacts, as shown in U.S. Pat. No. 11,031,734. While the configuration of the contacts allows the crosstalk to be reduced at the mounting ends, the contacts are difficult to manufacture and load due to the offset forces that can tilt the contacts in the housing.

It would, therefore, be beneficial to provide a connector which has angled contacts which allow for different patterns at the mating end and the mounting end and which distribute loading forces to ensure for a stable and reliable electrical connection and reduces crosstalk between contact pairs. It would also be beneficial to provide a connector that has angled contacts to create a staggered footprint to improve signal integrity while maintaining a mating interface which is backward compatible with previous connectors.

SUMMARY OF THE INVENTION

An embodiment is directed to an electrical connector having a housing with a mating end and a mounting end. Contacts are positioned in the housing. The contacts extend between the mating end and the mounting end. The contacts have mating contact receiving sections positioned proximate the mating end and circuit board mounting sections positioned proximate the mounting end. The contacts are angled relative to a plane of the mounting end of the housing wherein the mating contact receiving sections are offset from the circuit board mounting sections.

An embodiment is directed to an electrical connector for use in an electrical connector system which controls cross talk and signal radiation. The electrical connector having a housing with a plurality of modules with mating ends and mounting ends. Signal contacts are positioned in the modules and extend between the mating ends and the mounting ends. The signal contacts have signal mating contact receiving sections proximate the mating ends and signal circuit board mounting sections proximate the mounting ends. The signal contacts are angled relative to a plane of the mounting ends of the modules, wherein the signal mating contact receiving sections are offset from the signal circuit board mounting section. Ground contacts are positioned in the modules and extend between the mating ends and the mounting ends. The ground contacts have ground mating contact receiving sections proximate the mating ends and ground circuit board mounting sections proximate the mounting ends. The ground contacts are angled relative to the plane of the mounting ends of the modules, wherein the ground mating contact receiving sections are offset from the ground circuit board mounting sections.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
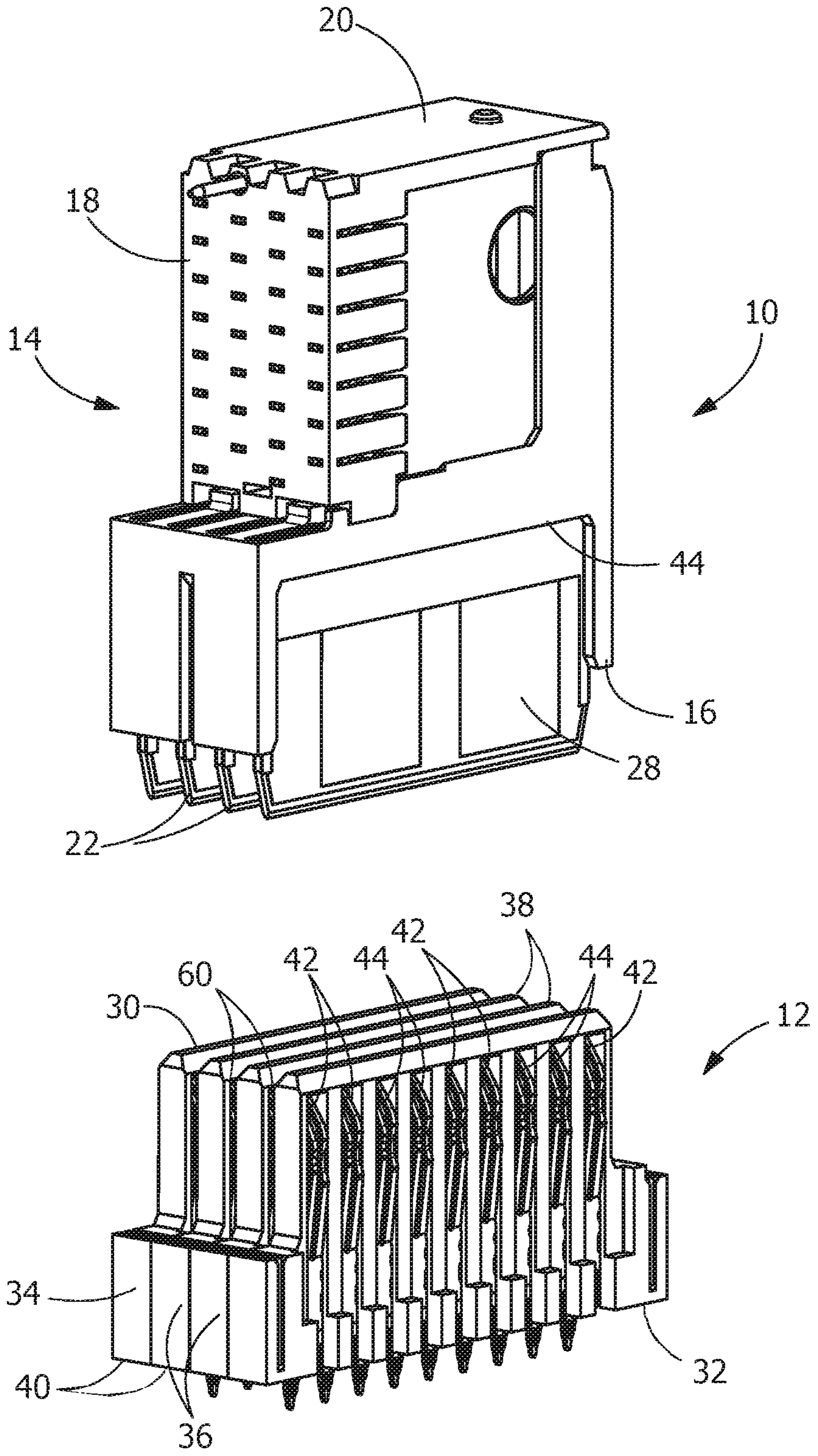
FIG. 1 is a first side, front perspective view of an illustrative connector system shown in an unassembled position, with a backplane connector and a mating daughtercard connector positioned above the backplane connector prior to mating therewith.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 2:
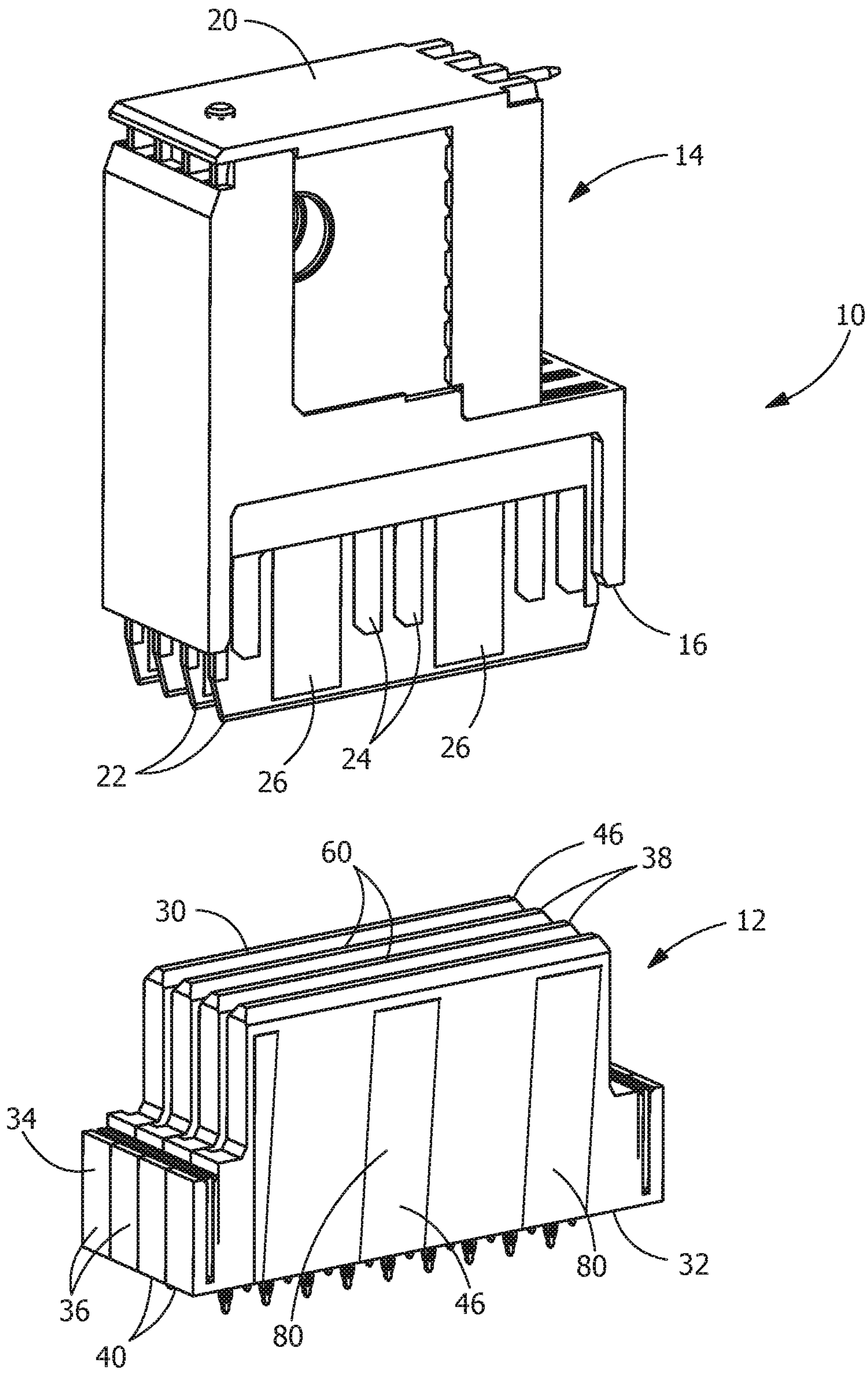
FIG. 2 is a second side, front perspective view of an illustrative connector system shown in FIG. 1.

FIGS. 1 and 2 show an illustrative electrical connector system 10 having a backplane connector 12 and a daughtercard connector 14 that are used to electrically connect a backplane circuit board (not shown) and a daughtercard circuit board (not shown). While the electrical connector system 10 is described herein with reference to backplane connectors 12 and daughtercard connectors 14, it is realized that the subject matter herein may be utilized with different types of electrical connectors other than a backplane connector or a daughtercard connector. The backplane connector 12, and the daughtercard connector 14 are merely illustrative of an electrical connector system 10. In particular, while different configurations of the backplane connector 12 may be used, the embodiment shown in FIGS. 3 through 8 is illustrative of the present invention.

In the illustrative embodiment shown, the daughtercard connector 14 constitutes a right angle connector wherein a mating interface 16 and mounting interface 18 of the daughtercard connector 14 are oriented perpendicular to one another. The daughtercard connector 14 is mounted to the daughtercard circuit board at the mounting interface 18. Other orientations of the interfaces 16, 18 are possible in alternative embodiments.

The daughtercard connector 14 includes a housing 20, made of one or more components, holding a plurality of circuit boards 22 therein. The circuit boards 22 have pairs of individual signal pathways or traces (not shown) that extend between the mating interface 16 and the mounting interface 18. The signal traces have signal conductive pads 24 provided proximate the mating interface 16. The circuit boards 22 have individual ground pathways or traces (not shown) that extend between the mating interface 16 and the mounting interface 18. The ground traces have ground conductive pads 26 provided proximate the mating interface 16. The circuit boards 22 also have ground pathways or traces 28 on opposites sides of the circuit boards 22 from the ground traces. The ground traces 28 extend between the mating interface 16 and the mounting interface 18. In alternative embodiments, the circuit boards 22 may be contact modules, the signal traces may be mating signal contacts and the ground traces may be ground contacts.

In the illustrated embodiment, the backplane connector 12 constitutes a header connector mounted to the backplane circuit board. However, other types of connectors may be used. When the backplane connector 12 is mated to the daughtercard connector 14, the daughtercard circuit board is oriented generally perpendicular with respect to the backplane circuit board.

The backplane connector 12 includes a mating end 30 and a mounting end 32 that are oriented generally parallel to one another. The backplane connector 12 is mounted to the backplane circuit board at the mounting end 32. Other orientations of the mating end 30 and the mounting end 32 are possible in alternative embodiments.

The backplane connector 12 includes a housing 34 which includes a plurality of individual housings or modules 36. Each of the modules 36 has a mating end 38 which mates with the daughtercard connector 14. Each of the modules 36 has a mounting end 40 which is mounted to the backplane circuit board. Each of the modules 36 holds a plurality of individual signal contacts 42 that extend between the mating end 38 and the mounting end 40. In the exemplary embodiment, the signal contacts 42 are arranged in pairs carrying differential signals. However, in other configurations, the signal contacts 42 may not be arranged in pairs for carrying single ended signals. Each of the modules 36 holds a plurality of ground contacts 44 that extend between the mating end 38 and the mounting end 40. In the illustrative embodiment shown, the ground contacts 44 are electrically connected to ground plates 46 that extend between the mating end 38 and the mounting end 40.

Figure 4:
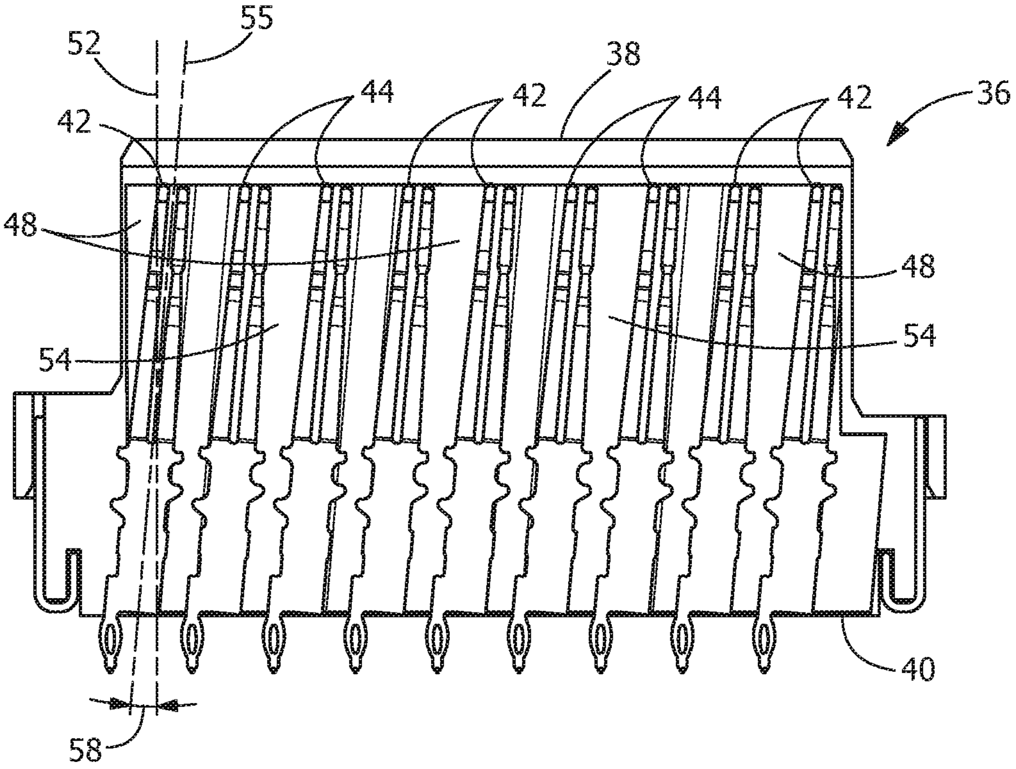
FIG. 4 is a front view of a first illustrative module of the backplane connector of FIG. 1.
Figure 5:
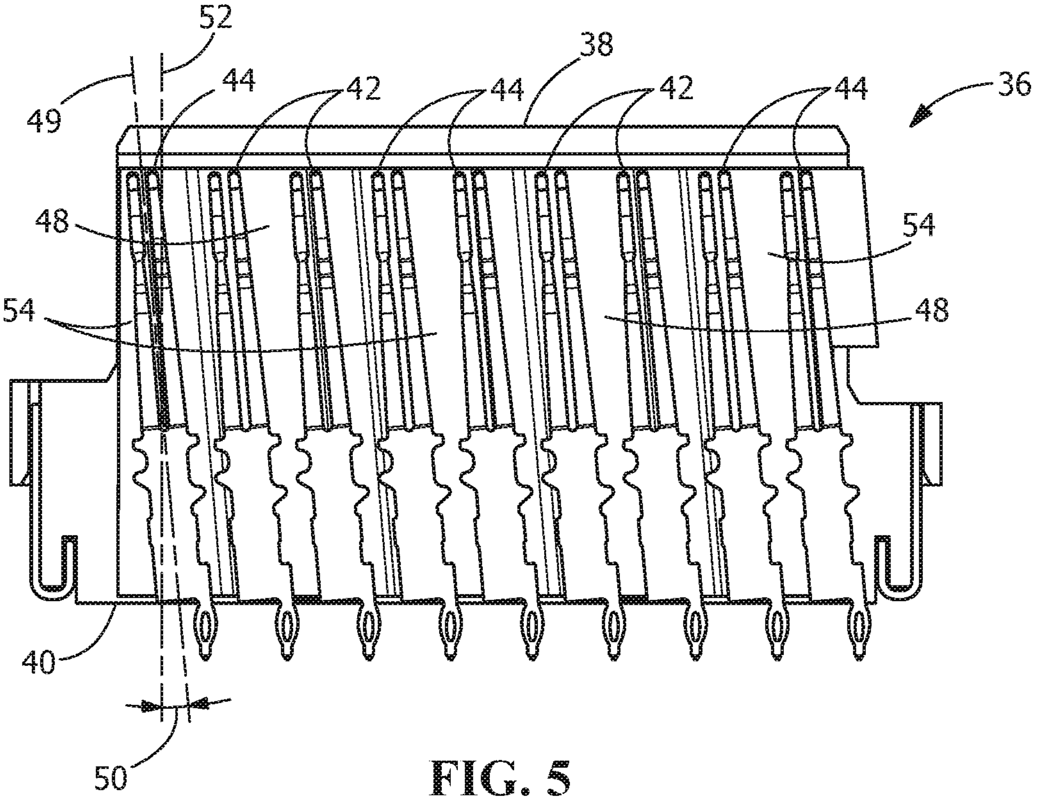
FIG. 5 is a front view of a second illustrative module of the backplane connector of FIG. 1.

As shown in FIGS. 4 and 5, each of the modules 36 include a plurality of signal cavities or channels 48 which extends between the mating end 38 and the mounting end 40. The signal channels 48 have center or longitudinal axes 49. The signal channels 48 receive the signal contacts 42 and the longitudinal axes 49 extend at angles 50 relative to mating axes 52 of the modules 36. The mating axis 52 of each module 36 is essentially perpendicular to the plane of the mounting end 40 of the module 36. The angles 50 are greater than 0 degrees and less than approximately 15 degrees, greater than approximately 3 degrees and less than approximately 12 degrees, or greater approximately 6 degrees and less than approximately 8 degrees.

Each of the modules 36 include a plurality of ground cavities or channels 54 which extend between the mating end 38 and the mounting end 40. The ground channels 54 have center or longitudinal axes 55. The ground channels 54 are open to slots 56. The ground channels 54 provide access to the ground plates 46 held in the slots 56. The ground channels 54 receive the ground contacts 44 and the longitudinal axes 55 extend at angles 58 relative to mating axes 52 of the modules 36. The angles 58 are greater than 0 degrees and less than approximately 15 degrees, greater than approximately 3 degrees and less than approximately 12 degrees, or greater approximately 6 degrees and less than approximately 8 degrees. The angles 58 may be the same or different than the angles 50.

Figure 3:
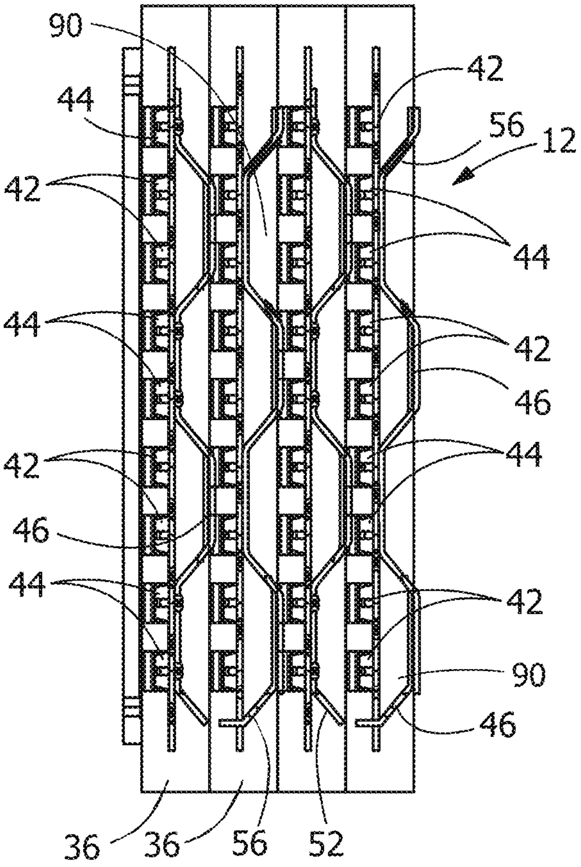
FIG. 3 is a bottom view of the backplane connector of FIG. 1.

Any number of ground channels 54 may be provided. The ground channels 54 may be provided at any locations within the modules 36. In an exemplary embodiment, the ground channels 54 are generally positioned between pairs of signal channels 48. As shown in FIG. 3, the slots 56 are sized and shaped to receive the shield or ground plates 46.

In the illustrative embodiment shown in FIGS. 1 and 2, the connector 12 has four modules 36 which are positioned adjacent to each other. However, other number of modules may be provided, such as, but not limited to, 8 modules or 16 modules. Circuit board receiving slots 60 are provided between adjacent modules 36. Each circuit board receiving slot 60 extends from the mating end 30 of the connector 12 toward the mounting end 32.

In the embodiment shown, the signal contacts 42 and the ground contacts 44 have the same configuration and the components of each will be identified with the same reference number. However, in other embodiments, the signal contacts 42 and the ground contacts 44 may have different configurations.

Figure 6:
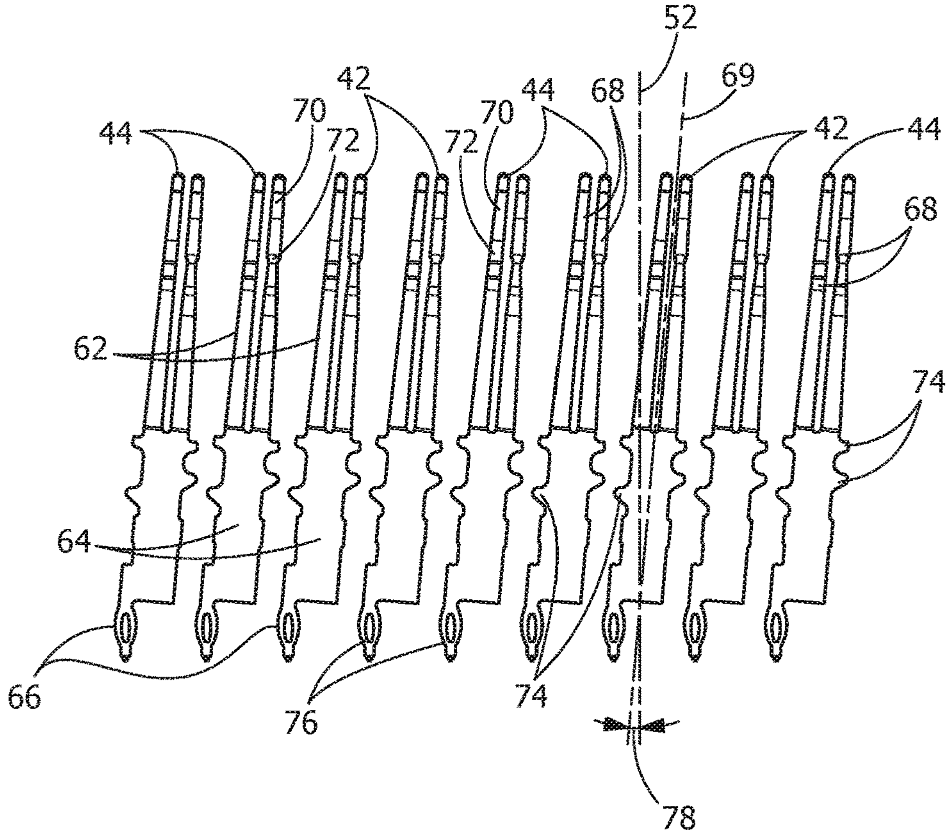
FIG. 6 is an enlarged front view of an illustrative contact of the module of FIG. 3.

As shown in FIG. 6, each signal contact 42 and ground contact 44 has a mating contact receiving section 62, a securing section 64 and circuit board mounting section 66. In the illustrative embodiment shown, the contact receiving section 62 includes two resilient arms 68 with lead in portions 70 and engagement portions 72. The resilient arms

62 are configured to press against the signal conductive pads 24 of the signal traces or the ground conductive pads 26 of the ground traces of the daughter card connector 14 when the daughter card connector 14 is mated to the backplane connector 12. The securing section 64 has retention members 74, which may be, but are not limited to barbs or projections, which extend from side surfaces of the securing section 64. The circuit board mounting section 66 has a compliant portion 76, such as an eye of the needle pin, although other configurations may be used.

As shown in FIGS. 4 and 5, each of the signal contacts 42 and ground contacts 44 have center or longitudinal axes 69. When positioned in the modules 36, the longitudinal axes 69 extend at angles 78 relative to mating axes 52 of the modules 36. The angles 78 are greater than 0 degrees and less than approximately 15 degrees, greater than approximately 3 degrees and less than approximately 12 degrees, or greater approximately 6 degrees and less than approximately 8 degrees.

As the signal contacts 42 and ground contacts 44 are angled relative to the mating axes 52 of the modules 36, the circuit board mounting sections 66 are offset from the securing sections 64 and the mating contact receiving sections 62. In various modules 36, the circuit board mounting sections 66 are offset to the left, as shown in FIG. 4. In other modules 36, the circuit board mounting sections 66 are offset to the right, as shown in FIG. 5. As the mounting sections 66 in one module 36 are offset from the mounting sections 66 of the in an adjacent module 36, the crosstalk is reduced in the footprint of the backplane connector 12, as the staggered pattern is configured for cancellation.

Figure 9:
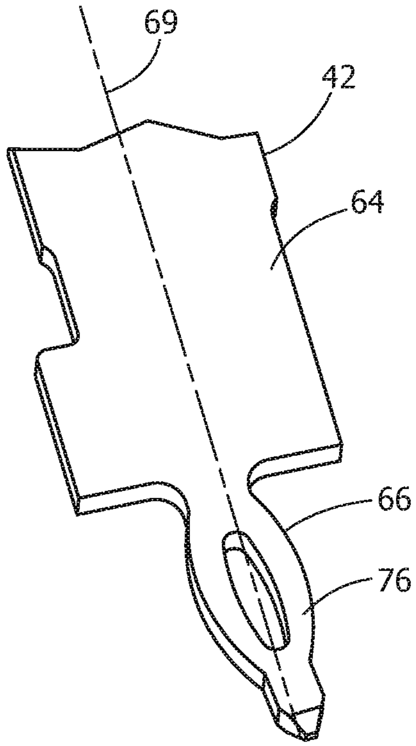
FIG. 9 is an enlarged front view of an illustrative alternate contact.

In the embodiment shown in FIG. 6, the compliant portions 76 are offset from the center or longitudinal axes 69 of the signal contacts 42 and ground contacts 44. In an alternate embodiment, as shown in FIG. 9, the compliant portions 76 are in line with the longitudinal axes 69 of the signal contacts 42 and ground contacts 44.

The retention members 74 of the securing sections 64 of the signal contacts 42 and the ground contacts 44 are spaced equidistant from the longitudinal axes 69 of the signal contacts 42 and the ground contacts 44. The positioning of the retention members 74 prevents the signal contacts 42 or the ground contacts 44 from tilting during insertion of the signal contacts 42 or the ground contacts 44 in the module 36.

Figure 7:
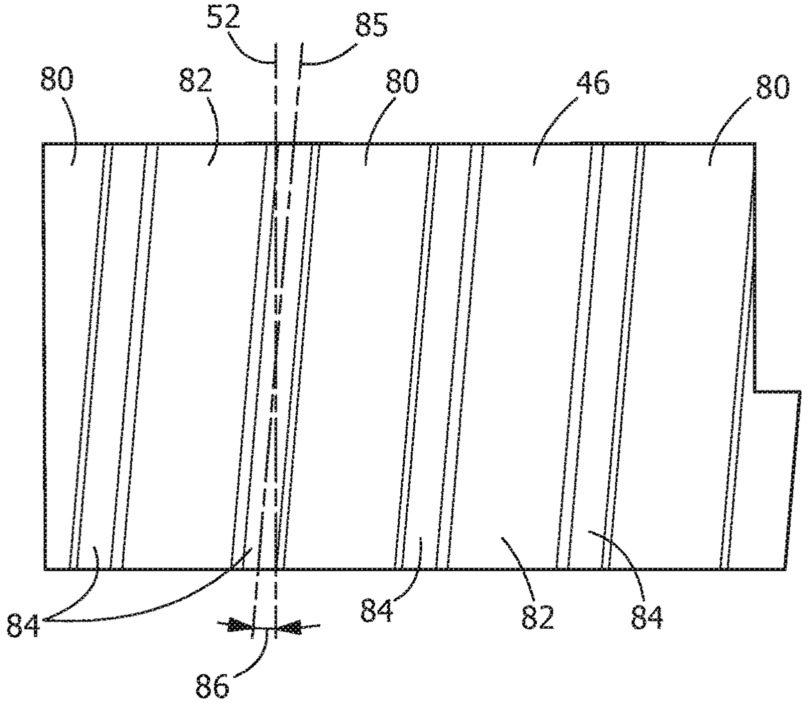
FIG. 7 is a front view of an illustrative ground plate of the module of FIG. 4.
Figure 8:
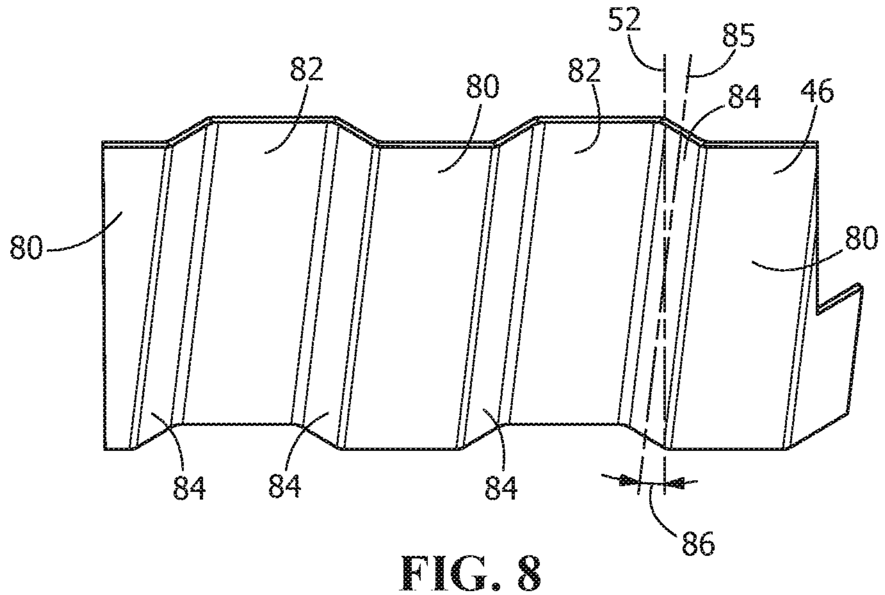
FIG. 8 is a top view of the ground plate of FIG. 7.

As shown in FIGS. 3, 7 and 8, the shield or ground plates 46 have a non-planar, wavy configuration to pass between and along pairs of signal contacts 42. The ground plates 46 may be shaped to be positioned generally equidistant from adjacent signal contacts 42.

The ground plates 46 have first sections 80 and second sections 82 which are positioned in a different plane than the first sections 80. Transition sections 84 extend between the first sections 80 and the second sections 82. The transition sections 84 have center or longitudinal axes 85. The longitudinal axes 85 of the transition sections 84 extend at angles 86 relative to mating axes 52 of the modules 36. The angles 86 are greater than 0 degrees and less than approximately 15 degrees, greater than approximately 3 degrees and less than approximately 12 degrees, or greater approximately 6 degrees and less than approximately 8 degrees. The angles 86 may be the same or different than the angles 50.

FIG. 3 is a bottom view of the backplane connector 12 with the ground plates 46 shown to illustrate the layout of the signal contacts 42, the ground contacts 44 and shield or ground plates 46. The ground contacts 44 and the shield or ground plates 46 entirely peripherally surround the pairs of signal contacts 42 to provide electrical shielding for the pairs of signal contacts 42. Gaps or spaces, which could allow EMI leakage between pairs of signal contacts 42, are minimized through or between the ground contacts 44 and the shield or ground plates 46.

The shield or ground plates 46 extend along multiple pairs of signal contacts 42. The shield or ground plates 46 engage the ground contacts 44 to electrically common the ground contacts 44 and the shield or ground plates 46 together. The ground contacts 44 and the shield or ground plates 46 form cavities 90 (FIG. 3) around the pairs of signal contacts 42. The cavities 90 may have any shape depending on the shapes of the ground contacts 44 and the shield or ground plates 46. In the illustrated embodiments, the cavities 90 have a hexagonal prism shape.

With the connector 12 properly assembled, the ground contacts 44 and the shield or ground plates 46 extend about the periphery of the pairs of signal contacts 42 and surround the pairs of signal contacts 42 to provide electrical shielding for the pairs of signal contacts 42. In an exemplary embodiment, entire, 360 degree shielding is provided by the ground contacts 44 and the shield or ground plates 46 along the length of the signal contacts 42. The ground contacts 44 and the shield or ground plates 46 surround portions of the mating signal traces when the connectors 12, 14 are mated. The ground contacts 44 and the shield or ground plates 46 provide shielding along the entire mating interface with the signal conductive pads 24 of the mating signal traces. The ground contacts 44 and the shield or ground plates 46 may control electrical characteristics at the mating interfaces 16, 20 and throughout the connector 12, such as by controlling cross talk, signal radiation, impedance or other electrical characteristics.

With the daughtercard connector 14 properly mated to the backplane connector 12, the circuit boards 22 of the daughter card connector 14 are positioned in the circuit board receiving slots 60 positioned between adjacent modules 36. In this position, the signal contacts 42 of the modules 36 physically and electrically engage the signal conductive pads 24 of the signal traces of the circuit boards 22. The ground contacts 44 of the modules 36 are also placed in physical and electrical engagement with the ground conductive pads 26 of the ground traces of the circuit boards 22.

The angling of the contacts relative to the mating axis of the connector allows for different patterns at the mating end and the mounting end creates a staggered footprint to improve signal integrity while maintaining a mating interface which is backward compatible with previous connectors. The configuration of the contacts also allows for proper distribution of the loading forces to ensure for a stable and reliable electrical connection.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. An electrical connector comprising:

a housing having a mating end and a mounting end, the mounting end extending in a plane which is essentially parallel to a plane of the mating end;

contact receiving channels extending between the mating end and the mounting end of the housing, the contact receiving channels having channel central axes which extend at channel angles relative to mating axes of the housing which extend in a plane perpendicular to the plane of the mounting end, the channel angles being greater than 0 degrees and less than 15 degrees;

contacts positioned in the contact receiving channels of the housing, the contacts extending between the mating end and the mounting end, the contacts having mating contact receiving sections proximate the mating end and circuit board mounting sections proximate the mounting end, the contacts having contact central axes which extend at contact angles relative to the mating axes of the housing which extend in a plane perpendicular to the plane of the mounting end, the contact angles being greater than 0 degrees and less than 15 degrees wherein the mating contact receiving sections are offset from the circuit board mounting sections;

retention members provided on the contacts between the mating contact receiving sections and the circuit board mounting sections, the retention members are spaced equidistant from the contact central axes of the contacts, the retention members properly position the contacts in the contact receiving channels;

wherein the of the retention members of the contacts allow for proper distribution of loading forces to ensure for a stable and reliable electrical connection.

2. The electrical connector as recited in claim 1, wherein the circuit board mounting sections have compliant sections.

3. The electrical connector as recited in claim 2, wherein the compliant sections are offset from the contact central axes of the contacts.

4. The electrical connector as recited in claim 2, wherein the compliant sections are in line with the contact central axes of the contacts.

5. The electrical connector as recited in claim 1, wherein the contact angles are between approximately 3 degrees and approximately 12 degrees.

6. An electrical connector for use in an electrical connector system which controls cross talk and signal radiation, the electrical connector comprising:

a housing having a plurality of modules, the modules having mating ends and mounting ends, the mounting end extending in a plane which is essentially parallel to a plane of the mating end;

signal contacts positioned in the modules, the signal contacts extending between the mating ends and the mounting ends, the signal contacts having signal mating contact receiving sections proximate the mating ends and signal circuit board mounting sections proximate the mounting ends, the signal contacts having signal contact central axes which extend at signal contact angles relative to mating axes of the housing which extend in a plane perpendicular to the plane of the mounting end, the signal contact angles being greater than 0 degrees and less than 15 degrees wherein the signal mating contact receiving sections are offset from the signal circuit board mounting sections;

ground contacts positioned in the modules, the ground contacts extending between the mating ends and the mounting ends, the ground contacts having ground mating contact receiving sections proximate the mating ends and ground circuit board mounting sections proximate the mounting ends, the ground contacts having ground contact central axes which extend at ground contact angles relative to the mating axes of the housing which extend in a plane perpendicular to the plane of the mounting end, the ground contact angles being greater than 0 degrees and less than 15 wherein the ground mating contact receiving sections are offset from the ground circuit board mounting sections;

retention members provided on the signal contacts and the ground contacts, the retention members are spaced equidistant from the signal contact central axes and the ground contact central axes, the retention members properly position the signal contacts and the ground contacts in the contact receiving channels;

wherein the retention members allow for proper distribution of loading forces on the signal contacts and the ground contacts to ensure for a stable and reliable electrical connection.

7. The electrical connector as recited in claim 6, wherein the signal contacts are arranged in pairs to carry differential signals, respective ground contacts of the ground contacts are positioned adjacent to respective signal contacts of the signal contacts.

8. The electrical connector as recited in claim 7, wherein the signal circuit board mounting sections in a respective module of the modules are offset from the signal circuit board mounting sections in a respective adjacent module of the modules wherein the crosstalk is reduced in the footprint of the signal contacts, as the offset pattern the signal circuit board mounting sections is configured for cancellation.

9. The electrical connector as recited in claim 8, wherein retention members are provided on the signal contacts and the ground contacts, respective retention members are spaced equidistant from the signal central axes and the ground central axes.

10. The electrical connector as recited in claim 8, wherein ground plates are positioned in the modules, the ground plates extend between the mating ends and the mounting ends, the ground contacts being electrically connected to the ground plates.

11. The electrical connector as recited in claim 10, wherein the ground plates have first shielding sections and second shielding sections, the second shielding sections being positioned in a different plane than the first shielding sections, transition sections extend between the first shielding sections and the second shielding sections.

12. The electrical connector as recited in claim 11, wherein the transition sections are angled relative to the plane of the mounting ends of the modules at approximately the same angles as the signal contacts and the ground contacts.

13. The electrical connector as recited in claim 6, wherein the signal contact angles and the ground contact angles are between approximately 3 degrees and 12 degrees.

14. The electrical connector as recited in claim 6, wherein the signal circuit board mounting sections and the ground circuit board mounting sections have compliant sections which are offset from the signal central axes of the signal contact and the ground central axes of the ground contacts.

15. The electrical connector as recited in claim 6, wherein the signal circuit board mounting sections and the ground circuit board mounting sections have compliant sections which are in line with the signal central axes of the signal contact and the ground central axes of the ground contacts.

16. The electrical connector as recited in claim 6, wherein retention members are provided on the signal contacts and the ground contacts, the retention members are spaced equidistant from the signal central axes of the signal contacts and the ground central axes of the ground contacts.

* * * * *